United States Patent
Dunlap et al.

(10) Patent No.: US 6,801,955 B2
(45) Date of Patent: Oct. 5, 2004

(54) SYSTEM AND METHOD FOR AUTOMATICALLY SELECTING A DIGITAL SENDING FUNCTIONALITY

(75) Inventors: Kendra L. Dunlap, Tigard, OR (US); Mark M. Josephsen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 416 days.

(21) Appl. No.: 09/825,606

(22) Filed: Apr. 3, 2001

(65) Prior Publication Data

US 2002/0144026 A1 Oct. 3, 2002

(51) Int. Cl.[7] .............................................. G06F 3/00
(52) U.S. Cl. .................... 710/8; 710/5; 710/8; 710/14; 710/62; 710/67; 345/156; 712/405
(58) Field of Search ................................ 710/2, 5, 6, 8, 710/10, 14, 15, 16, 33, 62, 65, 67, 72, 58; 345/156; 712/405

(56) References Cited

U.S. PATENT DOCUMENTS

| | | | |
|---|---|---|---|
| 5,878,230 A | * | 3/1999 | Weber et al. ................ 709/238 |
| 6,195,686 B1 | * | 2/2001 | Moon et al. ................. 709/206 |
| 2002/0126097 A1 | * | 9/2002 | Savolainen ................... 345/168 |
| 2003/0122881 A1 | * | 7/2003 | Yoshida ....................... 345/862 |

FOREIGN PATENT DOCUMENTS

| | | | | |
|---|---|---|---|---|
| EP | 1107570 A2 | * | 6/2001 | ............ H04N/1/32 |
| JP | 10336374 A | * | 12/1998 | ............ H04N/1/00 |
| JP | 2002024137 A | * | 1/2002 | ............ G06F/13/00 |
| JP | 2002268597 A | * | 9/2002 | ............ G09F/19/00 |
| WO | WO 200106397 A2 | * | 1/2001 | ............ G06F/17/00 |

* cited by examiner

Primary Examiner—Jeffrey Gaffin
Assistant Examiner—Angel L. Casiano (57) ABSTRACT

Systems and methods for automatically selecting digital sending functionality are provided. In one embodiment, the method comprises receiving input of a character, determining the nature of the character, determining whether a digital sending trigger has been satisfied, and where a digital sending trigger has been satisfied, automatically selecting a digital sending functionality based upon the type of the trigger. In a preferred embodiment, the invention comprises a multi-function peripheral device capable of photocopying, e-mailing, and faxing documents. The device comprises a device operation module adapted to: evaluate characters received via the control panel, determine whether the user desires to photocopy, e-mail, or fax based upon the received characters, and automatically enable and initiate the desired functionality.

20 Claims, 7 Drawing Sheets

SYSTEM AND METHOD FOR AUTOMATICALLY SELECTING A DIGITAL SENDING FUNCTIONALITY

FIELD OF THE INVENTION

The present disclosure relates to a system and method for automatically selecting a digital sending functionality. More particularly, the disclosure relates to a system and method for automatically selecting an e-mail or a facsimile functionality in response to user inputs.

BACKGROUND OF THE INVENTION

Conventionally, printing, photocopying, faxing, and e-mailing have each been accomplished through use of separate machines. Recently, however, multi-function peripheral (MFP) devices have been produced that provide the functionality of two or more of these separate machines. For instance, digital senders have been produced that both e-mail and fax documents that are scanned into electric form by the device.

Although the multiple functionality of MFP devices provides the user with the advantage of only having to purchase and store a single machine that can be used for multiple tasks, this multiple functionality can create user interface complexity. Specifically, use of an MFP device can be complicated by the fact that the user has several different options presented to him or her when a document is placed in the MFP device. For instance, when a document is inserted into an automatic document feeder of the MFP device, the user may need to specify whether the document is to be copied, e-mailed, or faxed by the MFP device.

Some machines provide many different dedicated keys for each device function. Although the desired functionality can be selected by the user with relative ease where the user is familiar with the function of these dedicated keys, selection can be more difficult where the user is unfamiliar with the machine. Indeed, the provision of many different keys can be confusing and even intimidating to the user. Other machines that do not have the space for many dedicated keys, for instance desktop models, are often provided with a general purpose interface that includes navigation keys with which the user can select the various device functionalities by navigating through a series of menus presented to the user in a device display. Although providing the user with a method for selecting the desired functionality, the process with which the user selects this functionality can be tedious in that the user may have to make many entries with the navigation keys before arriving at the desired functionality. In addition, the navigation process can be confusing and difficult to learn for new users. Furthermore, such interfaces normally comprise expensive hardware components and therefore increase the cost of the machine.

From the foregoing, it can be appreciated that it would be desirable to have a system and method for simplifying the task of accessing a desired functionality for digitally sending documents.

SUMMARY OF THE INVENTION

The present disclosure relates to a system and method for automatically selecting a digital sending functionality. In one embodiment, the method comprises receiving input of a character, determining the nature of the character, determining whether a digital sending trigger has been satisfied, and where a digital sending trigger has been satisfied, automatically selecting a digital sending functionality based upon the type of the trigger.

In one arrangement, the system used to perform the above method comprises means for receiving input of a character, means for determining the nature of the character, means for determining whether a digital sending trigger has been satisfied, and means for automatically selecting a digital sending functionality based upon the type of the trigger. Alternatively, the system comprises logic configured to receive input of a character, logic configured to determine the nature of the character, logic configured to determine whether a digital sending trigger has been satisfied, and logic configured to automatically select a digital sending functionality based upon the type of the trigger.

In a preferred embodiment, the invention comprises a multi-function peripheral device capable of photocopying, e-mailing, and faxing documents. The device comprises a control panel having a plurality of alphabetic and numeric keys, a device that recognizes input of a document by a user, and a device operation module adapted to evaluate characters received via the control panel, determine whether the user desires to photocopy, e-mail, or fax based upon the received characters, and automatically enable and initiate the desired functionality.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
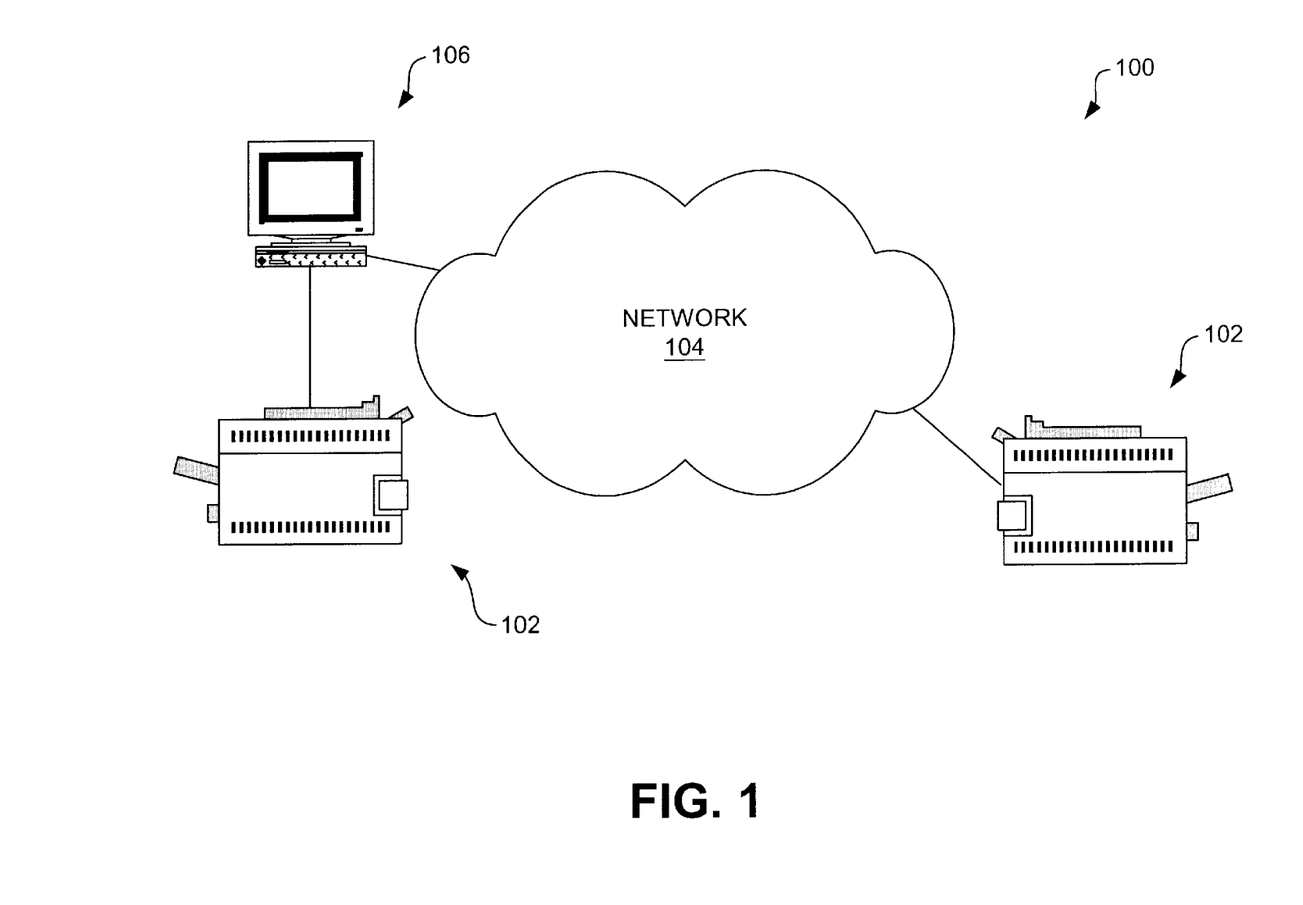
FIG. 1 is a schematic that illustrates an environment for the system and method of the present invention.

Referring now in more detail to the drawings, in which like numerals indicate corresponding parts throughout the several views, FIG. 1 illustrates an example environment 100 in which the system and method the present invention can be used. In particular, the system and method will be described as being implemented in a multi-function peripheral (MFP) device 102 that, as indicated in FIG. 1, can be connected to a network 104 and/or directly connected to a computing device 106. Although the system and method will be described herein as being implemented in an MFP device, it will be understood from the discussion that follows that the functionality provided by the inventive system and method could, alternatively, be utilized in other devices having multiple functionality to simplify the functionality selection process.

Figure 2:
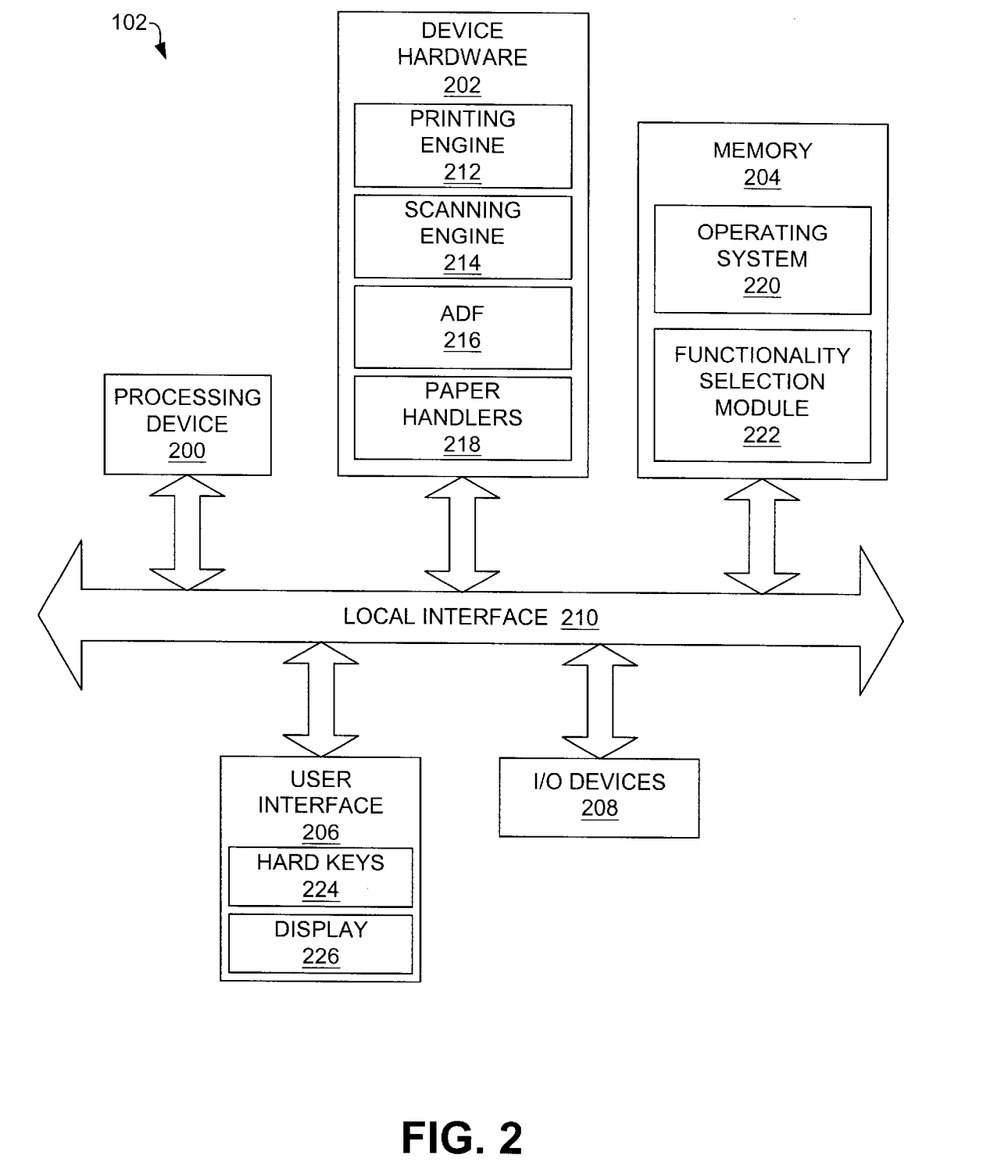
FIG. 2 is a schematic that illustrates an example architecture of a multi-function peripheral device shown in FIG. 1.

FIG. 2 is a schematic illustrating an example architecture for the MFP device 102 shown in FIG. 1. As indicated in FIG. 2, the MFP device 102 comprises a processing device 200, device hardware 202, device memory 204, a user interface 206, input/output devices 208, and a local interface 210 (e.g., one or more internal buses) to which each of the other identified components electrically connect. The processing device 200 is adapted to execute commands stored in memory 204 and can comprise a general-purpose processor, a microprocessor, one or more application-specific integrated circuits, and/or other known electrical configurations. The device hardware 202 includes various components used to facilitate the operation of the device 102. For instance, the device hardware 200 can include various components used to turn electronic information into hardcopy, such as a printing engine 212, and paper handlers 218, and components used to facilitate the transformation of hardcopy documents into electronic form such as a scanning engine 214 and an automatic document feeder (ADF) 216.

The user interface 206 typically comprises user interface tools such as hard keys 224 and a display 226 with which a user can input various commands and settings. The display 226 can comprise, for example, a liquid crystal display (LCD), a touch sensitive screen, a light emitting diode (LED) display, or combinations thereof. The input/output (I/O) devices 208 can include electrical interface elements for receiving electronic information from, by way of example, a computing device such as that illustrated in FIG. 1, where the MFP device is adapted for printing. Furthermore, the input/output devices 208 typically include electrical interface elements for transmitting electronic information from the MFP device 102 to other devices that are connected to the device either directly or indirectly (e.g., over a network). For instance, these interface elements can include a modem adapted to send data via e-mail or fax to a computing device and fax machine, respectively.

As identified in FIG. 2, the device memory 204 comprises a device operating system 220 that contains the various execution commands necessary to control the device hardware and its operation. In addition, the device memory 204 includes functionality selection module 222 that is adapted to automatically select a sending protocol in response to user input, as is discussed in greater detail below. The device operating system 220 and the functionality selection module 220 each can be implemented in software, firmware, or a combination thereof. In a preferred embodiment, the functionality selection module 220 is implemented in firmware stored in the device memory 204. It is to appreciated that, where the functionality selection module 220 is implemented in either software, firmware, or both, the functionality selection module can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette (magnetic), a random access memory (RAM), a read-only memory (ROM), an erasable programmable read-only memory (EPROM or Flash memory), an optical fiber, and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
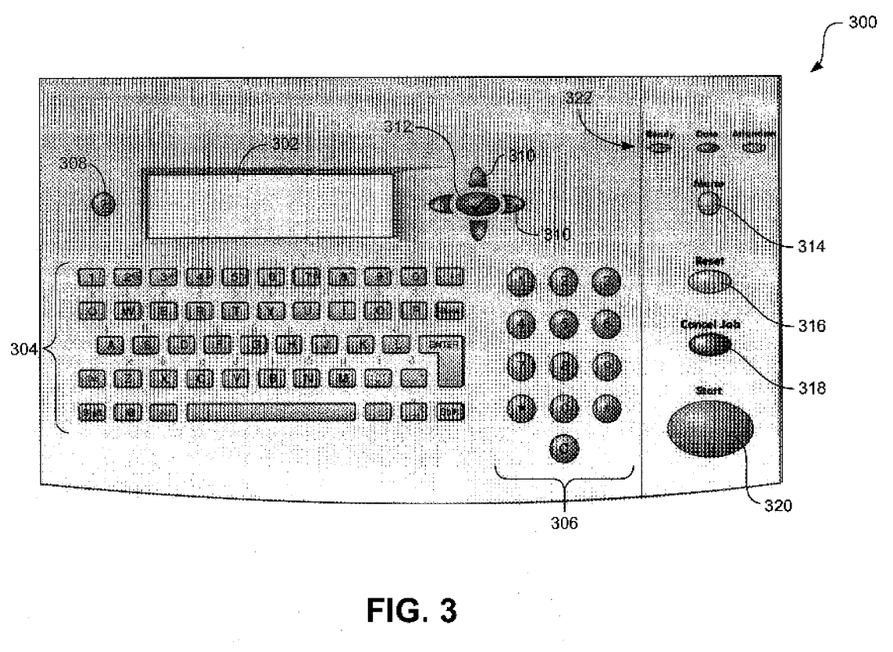
FIG. 3 is a schematic illustrating an example control panel of the multi-function peripheral shown in FIGS. 1 and 2.

FIG. 3 illustrates an example control panel 300 of the MFP device 102 that can be used to facilitate user interface with the device. As identified in this figure, the control panel 300 normally includes a display screen 302 with which information can be presented to the user and with which commands can be communicated to the MFP device 102. To lower the cost of the device 102, the display screen 302 preferably comprises an LCD that does not possess touch screen functionality. In addition to the display screen 302, the control panel 300 can include a keyboard 304 with which the user can enter various alphabetic and numeric characters. By way of example, this keyboard 304 typically is a QWERTY type keyboard, although it will be appreciated that other keyboard styles would also be suitable. In addition to the keyboard 304 is a numeric keypad 306 with which the user can enter numeric characters. As identified in FIG. 3, the numeric keypad 306 is normally arranged in similar manner to that found on conventional push-button telephones. As is discussed below, this arrangement aids the user in entering phone numbers when the fax functionality is desired.

In addition to the keyboard 304 and numeric keypad 306, the control panel 300 normally further includes a help button 308 with which the user can access tutorial information presented with the display screen 302, a series of directional keys 310 with which the user can navigate various menus presented via the display, and a select button 312 with which the user can select an item from one of these menus. The control panel 300 can additionally include a menu button 314, a reset button 316, a cancel job button 318, and a start button 320. The menu button 314 can be used to access the various menus that are presented to the user with the display screen 302. The reset button 316 resets the MFP device 102 after information has been entered by the user or various selections have been made. The cancel job button 318 is used to cancel a task that the MFP device 102 has begun to execute (e.g., a print job, a photocopy job, an e-mail job, or a fax job). Finally, the start button 320 is used to initiate a task to be performed by the MFP device 102. In addition to buttons, the control panel 300 can further include indicator lights 322 that identify the operational status of the MFP device 102. For instance, the indicator lights 322 can indicate that the device 102 is ready, that the data is being received or sent, or that there is a problem that calls for the user's attention.

Figure 4:
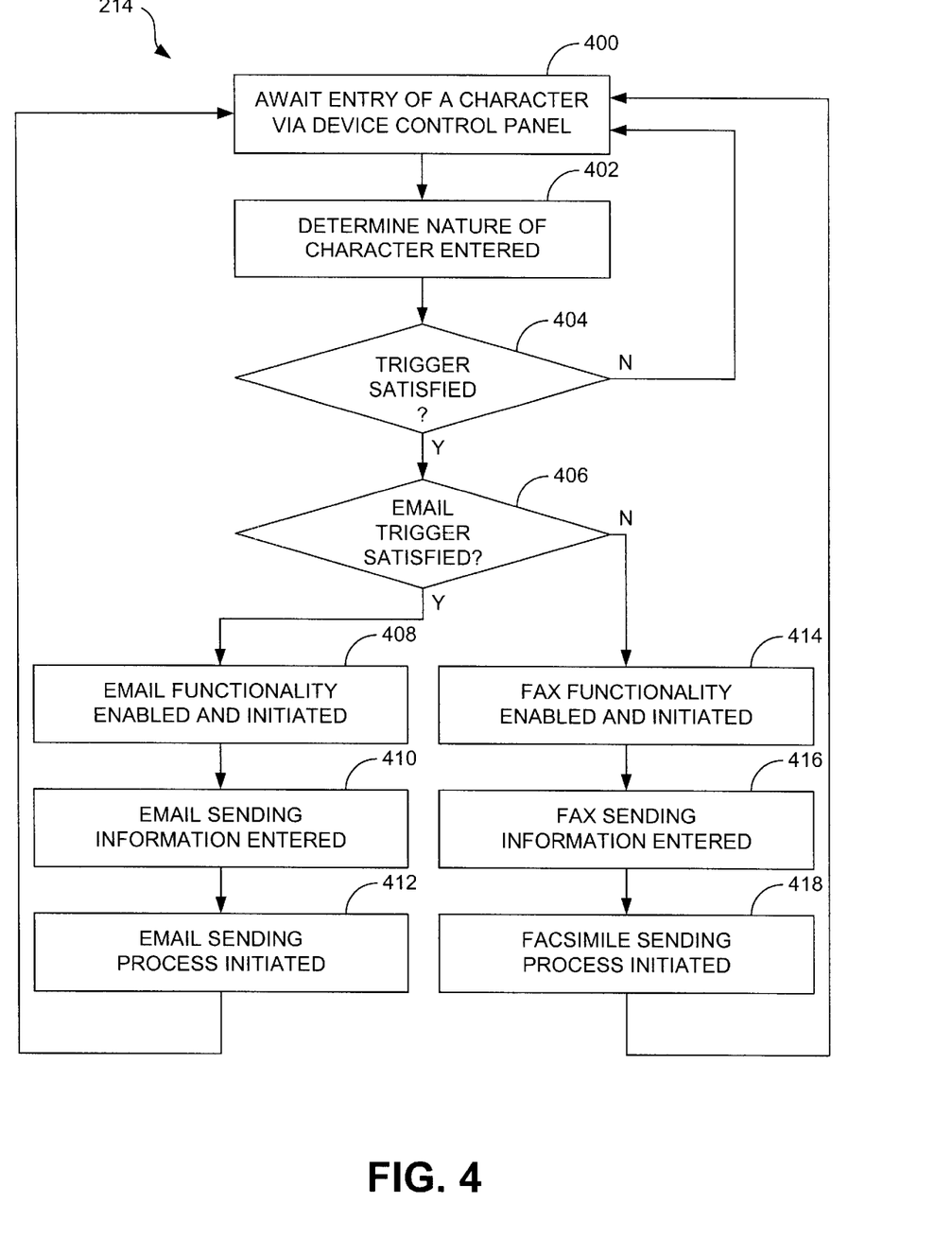
FIG. 4 is a flow chart illustrating the operation of a functionality selection module shown in FIG. 2.

FIG. 4 is a flow diagram that illustrates the operation of the functionality selection module 214 shown in FIG. 2. As mentioned above, this module 214 at least partially automates the e-mail/fax functionality selection process for the user to expedite and simplify this process. In particular, the functionality selection firmware 214 is adapted to recognize characters entered by the user with the control panel 300 and, based upon pre-determined triggers, determine whether the user wishes to photocopy, e-mail, or fax a document that has been inserted in the MFP device 102. As indicated in block 400, the functionality selection module 214 awaits input of a character (i.e., alphabetic, numeric, or symbol) that is entered via the device control panel 300. Where a character is entered, it normally has been entered to identify a number of copies the user wishes to make, a portion of the e-mail address to which the user would like to send a document, or a portion of a fax number to which the user would like to send the document.

Once a character is entered, the functionality selection module 214 determines the nature of the character, as indicated in block 402. In particular, the module 214 determines whether the character is a letter, number, or symbol. At this point, the module 214 determines, based upon the last received character, whether an e-mail or fax trigger has been satisfied, as indicated in decision element 404. As identified above, the triggers are used to automatically determine whether the user intends to photocopy, e-mail, or fax. The triggers comprise entry of one or more characters that, when entered, identify the functionality the user desires. By way of example, an e-mail trigger can comprise the entry of an alphabetic character in that such a character is not used to either identify a number of photocopies or a facsimile number. Other e-mail triggers can comprise characters or groups of characters particular to e-mail addresses. For instance, an e-mail trigger can additionally or alternatively comprise entry of the "@" symbol or entry of a top level domain (TLD) string such as ".com", ".net", ".gov", and the like.

In that entry of a numeric character can indicate the intent to photocopy, e-mail, or fax, a fax trigger can comprise the entry of a string of several numbers in a row. For instance, a trigger can comprise the entry of four numeric characters in a row. The entry of such a string of characters distinguishes an intent to make photocopies in that such a number exceeds the number of copies that can be selected with the device 102. In addition, this trigger distinguishes an intent to e-mail a document in that most e-mail addresses do not comprise such strings of numeric characters without the entry of at least one alphabetic character.

Irrespective of the type of triggers used by the functionality selection module 214, the module makes the determination as to whether a trigger has been satisfied, as indicated in decision element 404. If a trigger has not been satisfied, flow returns to block 400 and the module 214 awaits the input of a further character. If, on the other hand, a trigger is satisfied, flow continues to decision element 406 in which the module 214 determines the nature of the trigger so as to enable and initiate the proper functionality. For instance, if an e-mail trigger has been satisfied, flow continues to block 408 in which the e-mail functionality is enabled and initiated. At this point, the remainder of the e-mail sending information (at minimum, a full recipient e-mail address) can be entered (either in response to characters received from the user or automatically by the device) as indicated in block 410, and the e-mail sending process can be initiated as indicated in block 412. Once the e-mail sending procedure has been completed, flow returns to block 400 in which the functionality selection module 214 again awaits input of a character.

With reference back to decision element 406. if an e-mail trigger has not been satisfied, the trigger is a fax trigger and flow continues to block 414 in which the functionality selection module 214 enables and initiates the fax functionality. From this point, the remainder of the fax sending information (at minimum, a full recipient fax number) can be entered (either in response to characters received from the user or automatically by the device), as indicated in block 416. Once this information has been received, the facsimile sending process can be initiated, as indicated in block 418. As with the e-mail sending process, once the facsimile sending process has been completed, flow returns to block 400 where the functionality selection module 214 awaits input of a character from the user via the control panel 300.

Figure 5:
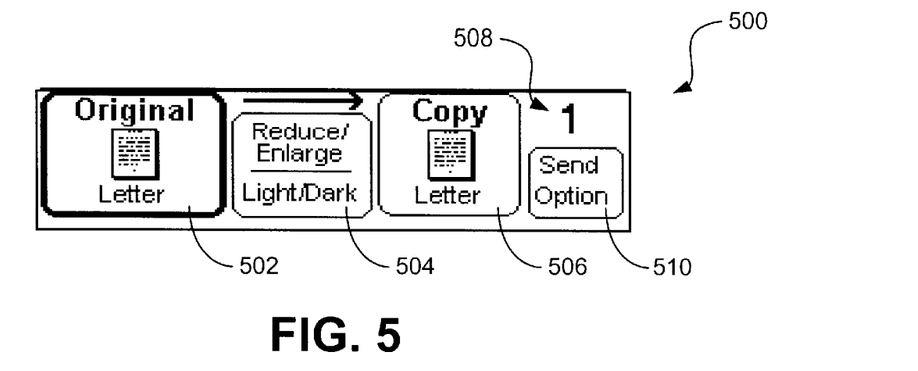
FIG. 5 is a schematic illustrating an example default screen that can be shown in the display of the multi-function peripheral device shown in FIGS. 1 and 2.
Figure 6:
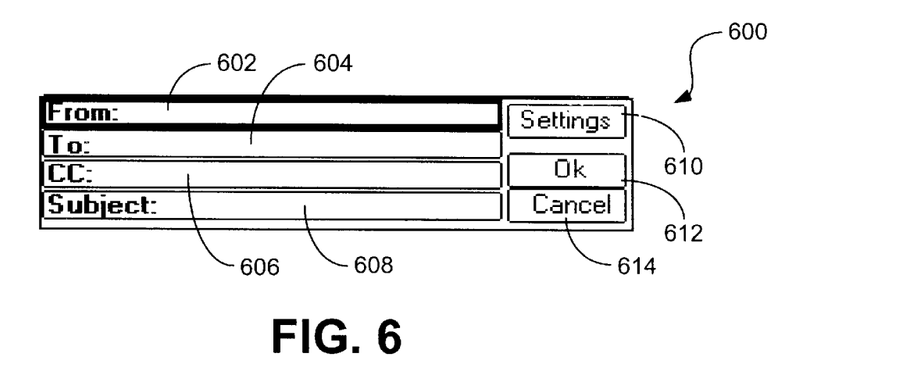
FIG. 6 is a schematic illustrating an example e-mail screen that can be shown in the display of the multi-function peripheral device shown in FIGS. 1 and 2.
Figure 7:
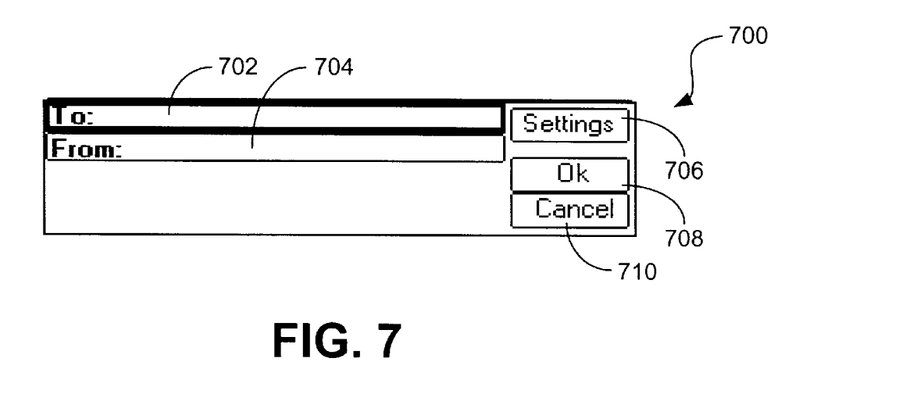
FIG. 7 is a schematic illustrating an example fax screen that can be shown in the display of the multi-function peripheral device shown in FIGS. 1 and 2.

FIGS. 5–7 illustrate various screens that can be presented to the user with the display screen 302 of the control panel 300. With reference first to FIG. 5, a default screen 500 is illustrated. By way of example, this default screen 500 can be displayed to the user whenever the device 102 has been reset through either a non-use timeout, or if the reset button 316 has been pressed. As indicated in FIG. 5, the default screen 500 includes an original settings indicator 502, a scale/contrast indicator 504, a copy settings indicator 506, a copy number indicator 508, and a send options button 510. The original settings indicator 502 is used to identify the current settings for the original document that has been placed in the MFP device 102 by the user. Similarly, the copy settings indicator 506 identifies the various settings for a photocopy that will be made of the original document if a photocopying functionality is selected by the user. As its name suggests, the scale/contrast indicator 504 is used to identify the scale (i.e., reduction/enlargement) that will be effected when a copy is made of the original documents, and the contrast (i.e., lightness/darkness) the copy will have. Finally, the copy number indicator 508 is used to convey the number of copies that will be made of the original document. Where the user does not wish to make a photocopy and, more particularly, wishes to digitally send the documents via e-mail or fax, the user can select the send options button 510 to be presented with these sending options.

FIG. 6 illustrates an e-mail screen 600 that can be accessed by the user, for example, by selection of the send option button 510 shown in FIG. 5 and navigation through one or more menus presented to the user with the display screen 302. The e-mail screen 600 can be used to identify the destination e-mail address to which the user wishes to send the documents, as well as various other information the user may wish to provide such as the user's e-mail address and an identification of the subject matter of the e-mail message. Accordingly, the e-mail screen 600 can include a "from" text field 602 in which the user can designate the originator e-mail address, a "to" text field 604 in which the user can identify the primary recipient e-mail address, a "cc" text field 606 in which the user can designate secondary recipient e-mail addresses, and a "subject" text field 608 in which the user can identify the subject of the message. In addition to the text fields 602–608, the e-mail screen 600 can include a "settings" button 610 with which the user can select the various mailing settings, an "ok" button 612 which can be used to initiate the e-mail sending process if an address has been entered in both the from and to text fields 602 and 604, as well as a "cancel" button 614 that can be used to cancel the mailing procedure.

FIG. 7 illustrates a fax screen 700 that can be used to enter the information relevant to a fax sending procedure. By way of example, the fax screen 700 can include a "to" text field 702 in which the user can enter a fax telephone number and a "from" text field 704 in which the user can enter his or her own fax number or other information that would identify the sender as the fax. In addition, like the e-mail screen 600, the fax screen 700 can include a "settings" button 706, an "ok" button 708, and a "cancel" button 710, each having similar functionality to the like-named buttons described above in reference to FIG. 6.

Figure 8:
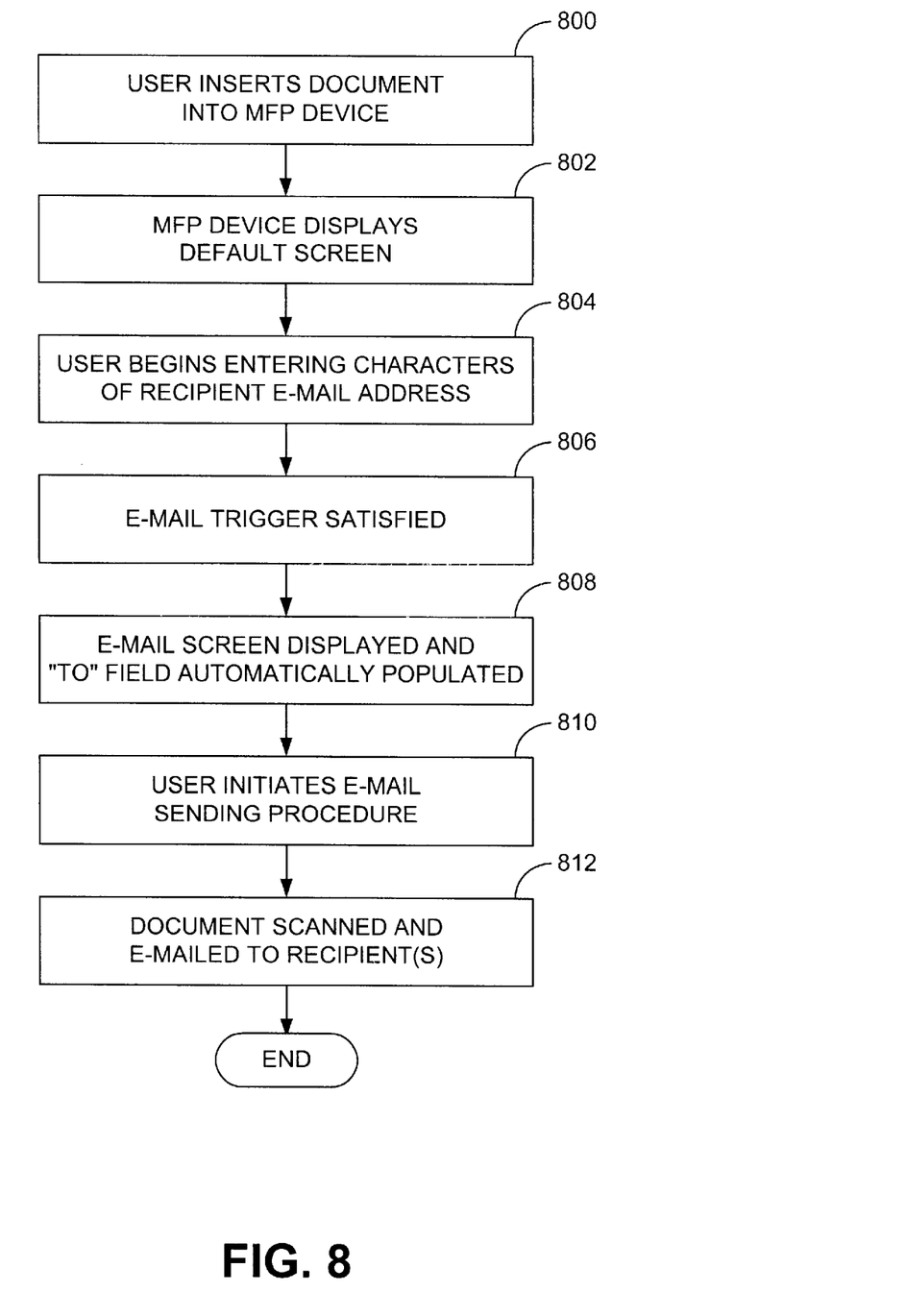
FIG. 8 is a flow chart illustrating a method for e-mailing with the multi-function peripheral device shown in FIGS. 1 and 2.

Operation of the MFP device 102 will now be discussed in reference to FIGS. 8 and 9. FIG. 8 illustrates a procedure for sending a document via e-mail with the MFP device 102. According to this procedure, a user first inserts a document into the MFP device 102, as indicated in block 800. As described above, this step can comprise placing a single page document on a platen of the device 102 or by inserting a multiple page document into an automatic document feeder of the device. Once the document has been inserted into the MFP device 102 in this manner, the display screen 302 normally presents the default screen 500 shown in FIG. 5, as indicated in block 802. Accordingly, the MFP device 102 automatically defaults to a photocopying functionality upon insertion of a document. Where the user wishes to send the document to a recipient via e-mail, the user begins entering the recipient e-mail address or addresses, as indicated in block 804. This address is entered by the user by selecting various keys of the keyboard 304 or the numeric keypad 306 of the control panel 300.

Normally, the e-mail address comprises a plurality of alphabetic characters that are entered by the user with the keyboard 304. Where one or more such alphabetic characters are entered by the user, an e-mail trigger is satisfied, as indicated in block 806. At this point, the MFP device 102 presents the e-mail screen 600 illustrated in FIG. 6 to the user and populates the "to" text field 604 with the characters that have been entered up to this point by the user, as indicated in block 808. The user can continue to enter the various characters of the recipient e-mail address. Where the MFP device 102 includes an auto-complete functionality in which the device cross-references the entered characters with a database of stored e-mail addresses, the MFP devices 102 attempts to automatically complete the e-mail address for the user and thereby automatically populate the "to" text field 604. Once the complete destination address or addresses (and sender address if desired) has/have been entered, the user can initiate the e-mail sending procedure, as indicated in block 810, by, for example, pressing the start button 320 of the control panel 300. At this point, the MFP device 102 will scan the document and send it to the identified recipients, as indicated in block 812.

Figure 9:
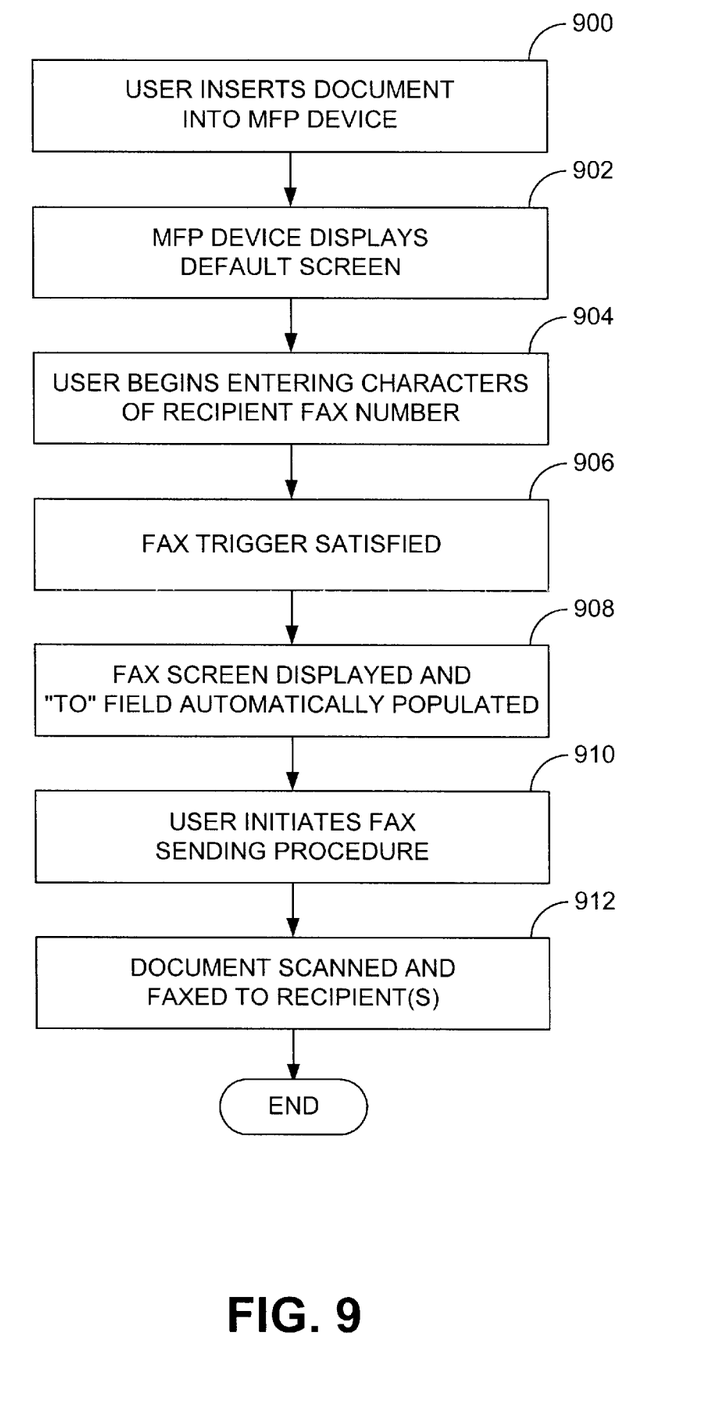
FIG. 9 is a flow chart illustrating an method for faxing with the multi-function peripheral device shown in FIGS. 1 and 2.

FIG. 9 illustrates a procedure for sending a document via facsimile with the MFP device 102. As indicated in block 900, a user first inserts a document into the MFP device 102. Again, this step can comprise placing a single page document on a platen of the device 102 or by inserting a multiple page document into an automatic document feeder of the device. Once the document has been inserted into the MFP device 102, the display screen 302 presents the default screen 500, as indicated in block 902. The user then begins entering the recipient fax number or numbers, as indicated in block 904. Typically, the numeric characters are entered with the numeric keypad 306 that, as mentioned above, is arranged as a conventional push-button telephone keypad. This arrangement aids the user in entering the phone number or numbers, as the case may be.

Once the number of numeric characters required for a fax trigger have been entered, the fax trigger is satisfied, as indicated in block 906 and the MFP device 102 presents the fax screen 700 to the user. Again, the device 102 populates the "to" text field 702 with the characters that have been entered up to this point by the user, as indicated in block 908. The user can then continue to enter the various characters of the recipient fax number. Also, where the MFP device 102 includes an auto-complete functionality, the device will attempt to automatically complete the recipient fax number. Once the complete destination fax number (and any other information desired by the user) has been entered, the user can initiate the fax sending procedure, as indicated in block 910, by, for example, pressing the start button 320 of the control panel 300. At this point, the MFP device 102 will scan the document and send it to the identified recipients, as indicated in block 912.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for automatically selecting a digital sending functionality of a digital sending device, the digital sending functionality comprising e-mailing and faxing, said method comprising:

receiving, at the device, a hardcopy document for scanning by the device;

displaying, at the device, a default screen operative to display characters input by an operator;

receiving, at the device, input of a character;

displaying the character with the default screen;

determining, at the device, the nature of the character;

determining whether a digital sending trigger of the device has been satisfied based on the nature of the character such that, if it is determined that the character is a letter, a digital sending e-mail trigger has been satisfied; and where a digital sending trigger of the device has been satisfied, automatically selecting a digital sending functionality of the device based upon the type of the trigger such that, if the digital sending e-mail trigger has been satisfied, e-mailing functionality of the device is automatically selected with a "to" text field for e-mailing information corresponding to the hardcopy document being automatically populated with the character.

2. The method of claim 1, wherein receiving input of a character comprises receiving an input from a control panel having a plurality of alphabetic and numeric keys.

3. The method of claim 1, wherein determining whether a digital sending trigger has been satisfied comprises determining whether a digital sending fax trigger has been satisfied based on the nature of the character such that, if the digital sending fax trigger has been satisfied, facsimile functionality of the device is automatically selected with a "to" text field for faxing information corresponding to the hardcopy document being automatically populated with the character.

4. The method of claim 3, wherein the fax trigger comprises receipt of a string of several numeric characters in a row.

5. The method of claim 4, wherein the fax trigger comprises receipt of a string of four numbers in a row.

6. The method of claim 1, wherein another e-mail trigger comprises receipt of an "@" symbol.

7. The method of claim 1, wherein another e-mail trigger comprises receipt of a top level domain (TLD) string.

8. A method for automatically selecting a functionality of a digital sending device, the functionality comprising copying, e-mailing and faxing, said method comprising:

receiving, at the device, a hardcopy document for scanning by the device;

in response to receiving the hardcopy document, displaying, at the device, a default screen operative to display characters input by an operator;

receiving, at the device, manual input of a character by the operator;

in response to receiving the manual input of the character by the operator, displaying the character with the default screen;

determining, at the device, the nature of the character input by the operator; and determining whether a trigger of the device has been satisfied based on the nature of the character such that:

if it is determined that the character is not associated with a destination address to which information corresponding to the hardcopy document is to be sent, copying functionality of the device is automatically selected, and a number of copies of the hardcopy document corresponding to the character is printed by the device;

if it is determined that the character is associated with a destination address to which information corresponding to the hardcopy document is to be sent and:

an e-mail trigger has been satisfied, emailing functionality of the device is automatically selected, and a "to" text field of the device operative to display a destination address is automatically populated with the character for e-mailing the information corresponding to the hardcopy document; and a facsimile trigger has been satisfied, faxing functionality of the device is automatically selected, and a "to" text field of the device operative to display a destination address is automatically populated with the character for faxing the information corresponding to the hardcopy document.

9. The method of claim 8, wherein the e-mail trigger comprises receipt of an "@" symbol.

10. The method of claim 8, wherein the e-mail trigger comprises receipt of a top level domain (TLD) string.

11. The method of claim 8, wherein the facsimile trigger comprises receipt of a string of several numeric characters in a row.

12. The method of claim 8, wherein the facsimile trigger comprises receipt of a string of four numbers in a row.

13. A system on a computer-readable medium for automatically selecting functionality of a digital sending device, the digital sending device being operative to receive a hardcopy document for scanning, the functionality comprising copying, e-mailing and faxing, said system comprising:

logic configured to display a default screen operative to display characters input by an operator;

logic configured to receive input of a character by the operator;

logic configured to displaying the character with the default screen in response to receiving the input of the character by the operator;

logic configured to determine the nature of the character input by the operator; and logic configured to determine whether a trigger of the device has been satisfied based on the nature of the character such that:

if it is determined that the character is not associated with a destination address to which information corresponding to a hardcopy document is to be sent, copying functionality of the device is automatically selected, and a number of copies of the hardcopy document corresponding to the character is printed by the device;

if it is determined that the character is associated with a destination address to which information corresponding to the hardcopy document is to be sent and:

an e-mail trigger has been satisfied, emailing functionality of the device is automatically selected, and a "to" text field of the device operative to display a destination address is automatically populated with the character for e-mailing the information corresponding to the hardcopy document; and a facsimile trigger has been satisfied, faxing functionality of the device is automatically selected, and a "to" text field of the device operative to display a destination address is automatically populated with the character for faxing the information corresponding to the hardcopy document.

14. The system of claim 13, wherein the logic configured to receive input of a character comprises logic configured to receive an input from a control panel having a plurality of alphabetic and numeric keys.

15. The system of claim 13, wherein the logic configured to determine the nature of the character comprises logic configured to determine whether the character is a letter, number or symbol.

16. The system of claim 13, wherein the logic configured to determine whether a digital sending trigger has been satisfied comprises logic configured to determine whether an e-mail trigger or a fax trigger has been satisfied.

17. The system of claim 13, wherein the e-mail trigger comprises receipt of an "@" symbol.

18. The system of claim 13, wherein the e-mail trigger comprises receipt of a top level domain (TLD) string.

19. The system of claim 13, wherein the fax trigger comprises receipt of a string of several numeric characters in a row.

20. The system of claim 13, wherein the fax trigger comprises receipt of a string of four numbers in a row.

* * * * *